US012352022B2

(12) United States Patent
Sapsara

(10) Patent No.: US 12,352,022 B2
(45) Date of Patent: Jul. 8, 2025

(54) POINT-OF-USE INSTANT HOT WATER SHOWER HEAD DISPENSER

(71) Applicant: Paul Sapsara, New Kensington, PA (US)

(72) Inventor: Paul Sapsara, New Kensington, PA (US)

( * ) Notice: Subject to any disclaimer, the term of this patent is extended or adjusted under 35 U.S.C. 154(b) by 237 days.

(21) Appl. No.: 18/311,350

(22) Filed: May 3, 2023

(65) Prior Publication Data

US 2024/0218642 A1 Jul. 4, 2024

Related U.S. Application Data

(60) Provisional application No. 63/477,619, filed on Dec. 29, 2022.

(51) Int. Cl.
*E03C 1/04* (2006.01)
*B05B 1/18* (2006.01)

(52) U.S. Cl.
CPC .............. *E03C 1/0408* (2013.01); *B05B 1/18* (2013.01)

(58) Field of Classification Search
CPC ........ E03B 1/048; E03B 7/045; E03C 1/0408; F24D 19/1051
See application file for complete search history.

(56) References Cited

U.S. PATENT DOCUMENTS

| | | | | |
|---|---|---|---|---|
| 6,588,377 | B1 * | 7/2003 | Leary | E03B 1/048 122/13.3 |
| 8,066,196 | B2 * | 11/2011 | McMurtry | E03B 1/048 236/12.13 |
| 8,978,993 | B1 * | 3/2015 | Romero | F16K 31/002 236/93 R |
| 9,309,655 | B2 | 4/2016 | Brown et al. | |
| 10,066,376 | B2 | 9/2018 | Doss et al. | |
| 10,967,390 | B2 | 4/2021 | Lord et al. | |
| 2017/0321398 | A1 | 11/2017 | Ellerby | |
| 2021/0220846 | A1 | 7/2021 | Lord et al. | |

* cited by examiner

*Primary Examiner* — Jonathan Bradford
(74) *Attorney, Agent, or Firm* — Kathleen Ruznicki; The Lynch Law Group, LLC

(57) ABSTRACT

A water conservation system having a series of thermostatic diverter valves that circulate water from both an internal insulated chamber that stores hot water from a previous use and a connected hot water source which utilizes a piping system where water cools down in between uses, through a network of internal channels based on the temperature of the water at any given time, thereby providing instant hot water in bathing and showering applications to a user, while not using electrical or mechanical heating elements of any kind.

8 Claims, 4 Drawing Sheets

POINT-OF-USE INSTANT HOT WATER SHOWER HEAD DISPENSER

FIELD OF THE INVENTION

This invention relates to domestic and commercial water systems, and more specifically, hot water applications in bathing and showering.

BACKGROUND

Typically, water systems for bathing and shower uses consist of a hot water source, a piping system to transport the water from the hot water source to either a spigot or a showerhead. Ordinarily between uses, water in the piping system cools down to less than desirable temperature for most users. Generally, users turn on and run the water to eliminate the water that had cooled in the piping system until the running water from the hot water source becomes available and the optimal temperature for use is reached. It is estimated that that while running a shower, an average of two gallons of water is moved through the system every minute. So even if it only takes two minutes to optimally heat the water, four gallons of water is wasted per user per day. In California, having 40 million residents, this could mean a waste of 160 million gallons of water per day, or almost 60 billion gallons per year.

What is needed is a new water conservation system that will stop this abhorrent waste of potable water. Hot water generated from a previous bathing or showering use will be stored in an insulated chamber directly attached to a spigot or a showerhead until the next use. When a user turns on the water in their bath or shower, they will immediately experience water at the optimal temperature and the cold water that was sitting in the piping system will be diverted from immediately going to the spigot or showerhead until heated to the optimal temperature.

SUMMARY OF THE INVENTION

Disclosed is a water system for having water at or near an optimal temperature from a previous use in bathing and showering applications immediately available to the user. The water system device will be comprised of a series of internal channels or tubes that are regulated by a series of thermostatic diverter valves that will control the circulation of water based on temperature. The device will be capable of recirculating water below the optimal temperature to mix with water at or near the optimal temperature until mixture is at or near the optimal temperature. This continuous recirculation and mixing will eventually raise the mixture temperature to be at or near the optimal temperature. After sensing the mixture is at or near the optimal temperature, the water will be directed to a water output gadget such as a showerhead.

An advantage of this invention is that it will require no additional electricity or gas or electrical components and will be easy to install with no prior knowledge or expertise in complex plumbing applications. Though discussed as mainly having shower and bath applications, any application where optimal warm to hot water temperature is needed or desired immediately is contemplated by this disclosure.

DETAILED DESCRIPTION

Figure 1:
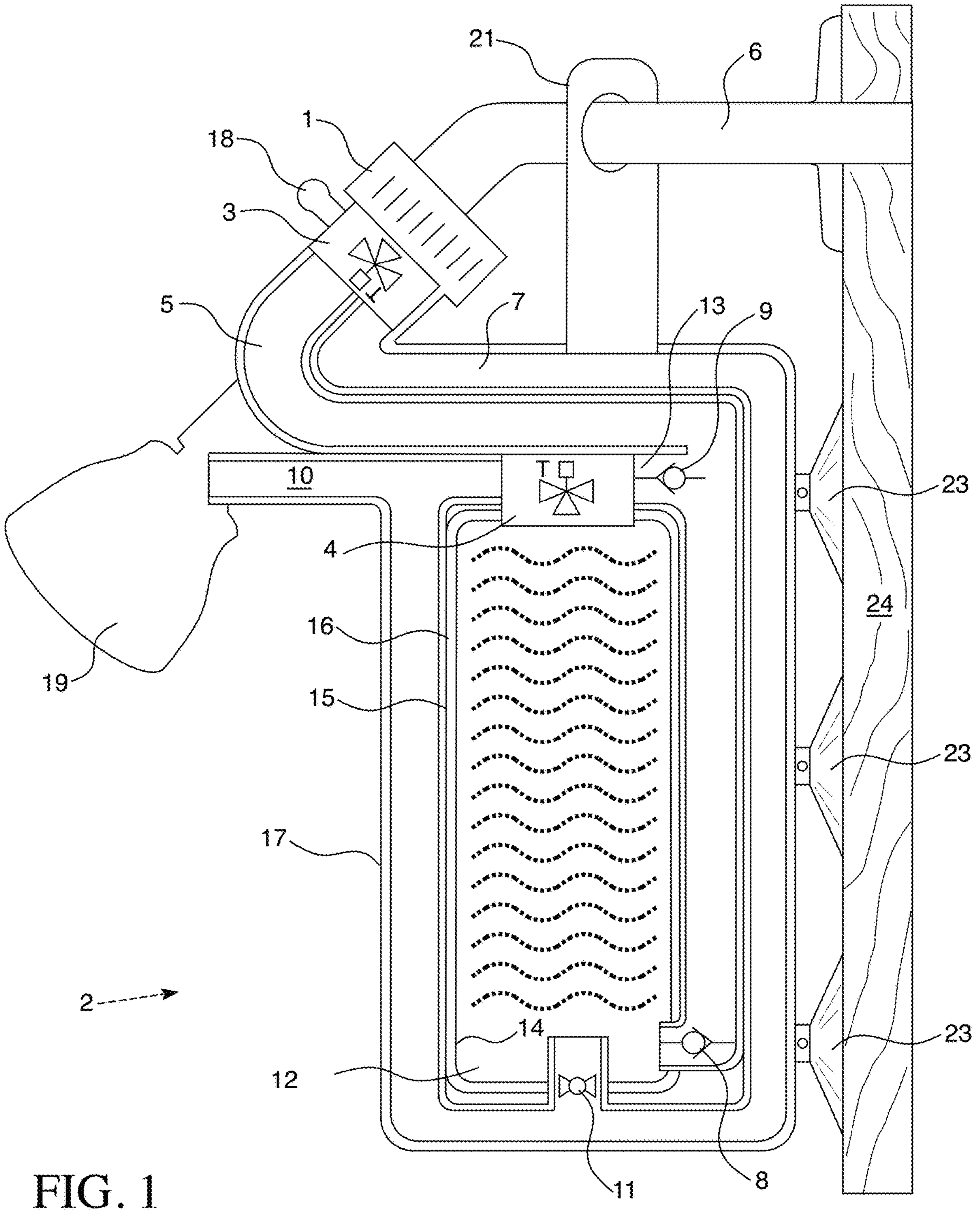
FIG. 1 shows a bisectional view of the device in a static configuration before the user turns on their shower or bath, the device having hot water in the insulated chamber from a previous use.

This invention is a device that stores hot water from a previous use in an insulated chamber and keeps that stored water at a constant or near-constant temperature to be used in the next bath or shower application. Typically, the target timeframe for the next use will be within twenty-four hours for water to remain at or near the optimal desired temperature of the user.

However, this time frame could be shorter or longer depending on many factors including but not limited to the type of insulation used and the capabilities of the hot water source. The hot water source could a typical water heater such as that found in residential buildings such as single/multiple family homes/apartment buildings, commercial facilities such as hotels/motels, or institutional facilities such as hospitals/senior living care centers.

The terms hot water and water at or near the optimal temperature are used interchangeably, likewise cold water and water below the optimal temperature are used interchangeably. The connections and/or positional relationships described, unless specified otherwise, can be direct or indirect, and the present invention is not intended to be limiting in this respect. The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

In one non-limiting embodiment as shown in FIGS. 1-4, device 2 is comprised of an initial thermostatic diverter valve 3, a cold water channel 5, a hot water channel 7, inlet check valve 8, flow control valve 11, recirculation channel 13, insulated chamber 15 with a bottom end 12 and a top end 16, and whose interior is covered with insulation layer 14, recirculating thermostatic diverter valve 4, recirculating check valve 9 and outflow pipe 10. All these components are positioned within unit encasement 17. Optionally, thermostatic diverter valve 3 may comprise a bypass switch 18 for those occasions when the user wishes to have cold water run through the showerhead 19 rather water at or near the optimal temperature. If desired, the user can bypass device 2 simply by sliding the bypass switch 18 within thermostatic diverter valve 3, thus allowing water from the source to be dispensed to the user without routing through device 2.

Also as shown in FIGS. 1-4 is shower arm 6, which is a nonlimiting example of a water inlet channel, which cooperates with a hot water source via piping (not shown) to deliver the water to the showerhead 19, which is a non-limiting example of a water output gadget. A non-limiting way to connect the device, a specialized wall arm coupler 1 and a shower arm hook 21 can be used to attach the device 2 to shower arm 6. Optionally, to further support device 2, a plurality of suction cups 23 can be used on shower wall 24 as depicted.

In the static configuration as shown in FIG. 1, water at or near the optimal temperature (symbolized by short, dashed lines) is stored in chamber 15 and kept at the at or near the optimal temperature by insulation 14. Cold water channel 5 and hot water channel 7 may initially be devoid of water when a water source that produces water at or near the optimal temperature is activated.

Figure 2:
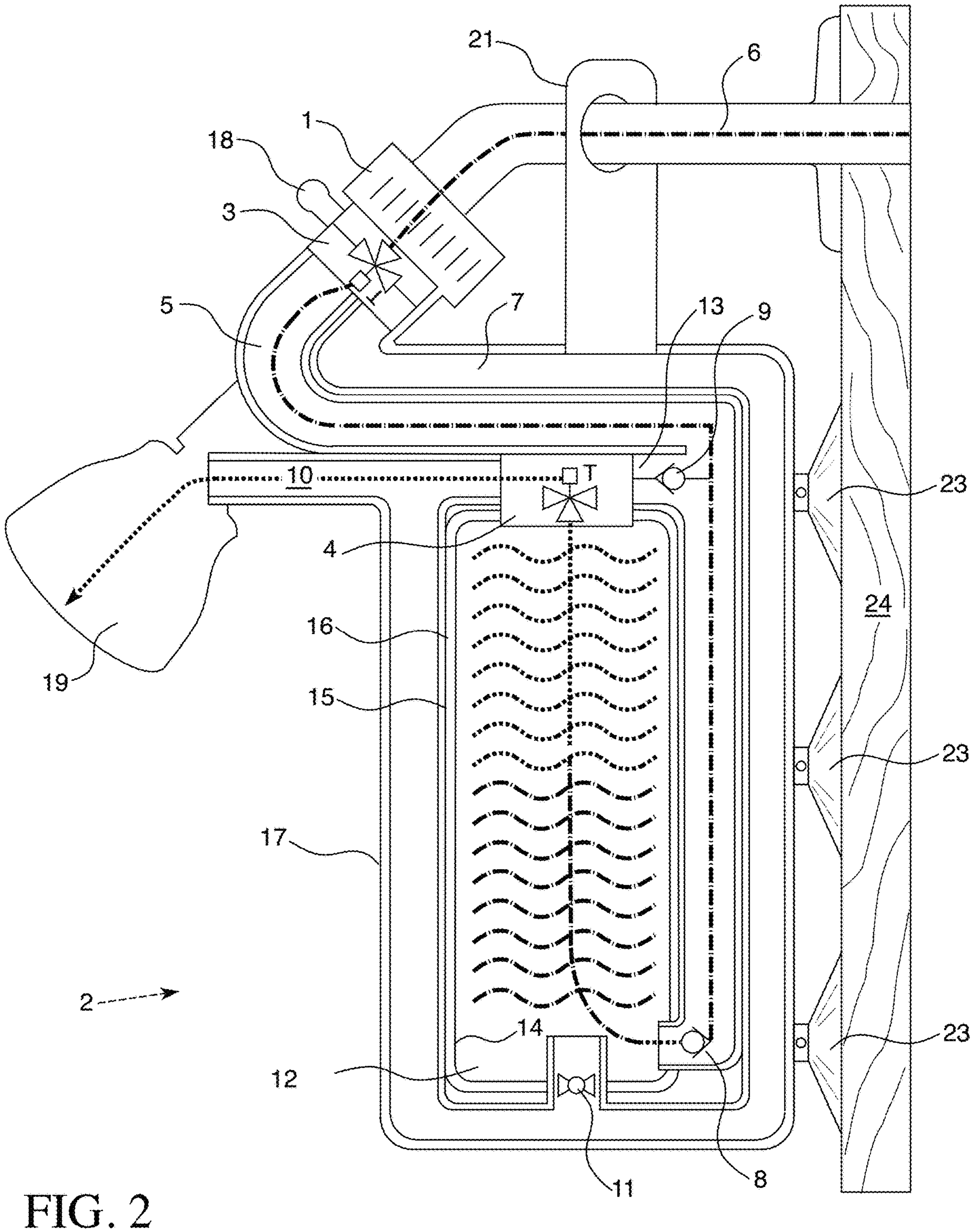
FIG. 2 shows a bisectional view of the device after initial engagement of the device and the active flow of an initial rush of cold water.

During the initial engagement of device 2 as shown in FIG. 2 the initial flow of cold water (symbolized by line/dot pattern) from the piping enters device 2 via shower arm 6 and is routed to initial thermostatic diverter valve 3. Initial thermostatic diverter valve 3 upon sensing the water as being below the optimal temperature diverts the cold water to cold water channel 5 which transports the cold water the bottom end 12 of the insulated chamber 15 where the cold water enters the insulated chamber 15 via inlet check valve 8. As the cold water enters insulated chamber 15, it pushes the stored hot water up and through a recirculating thermostatic diverter valve 4 located at the top end 16 of insulated chamber 15. Recirculating thermostatic diverter 4, initially sensing the hot water being at or near the optimal temperature diverts the hot water through the showerhead 19 via outflow pipe 10.

Figure 3:
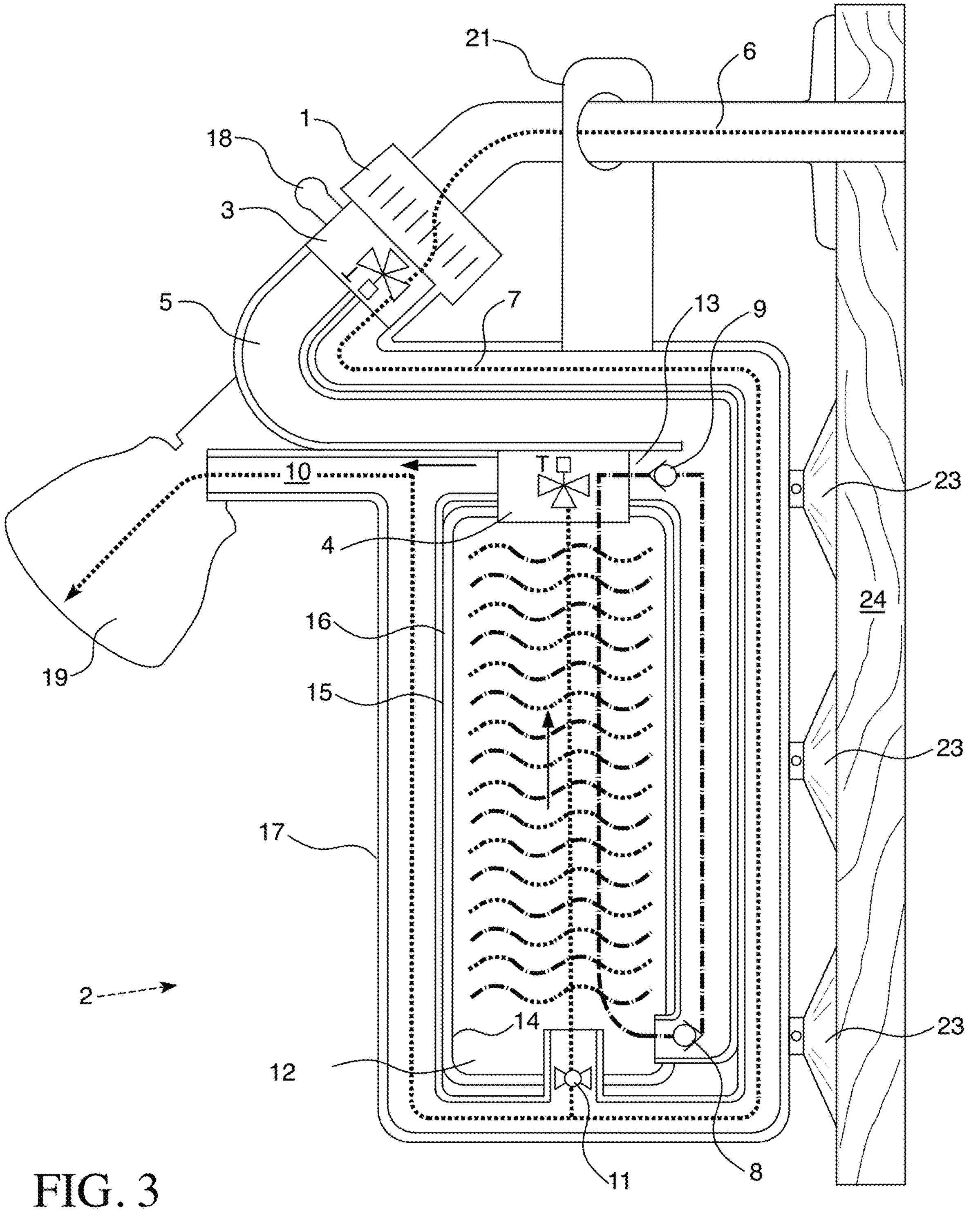
FIG. 3 shows a bisectional view of the device after hot water enters the device from hot water source and there is cold water recirculation.
Figure 4:
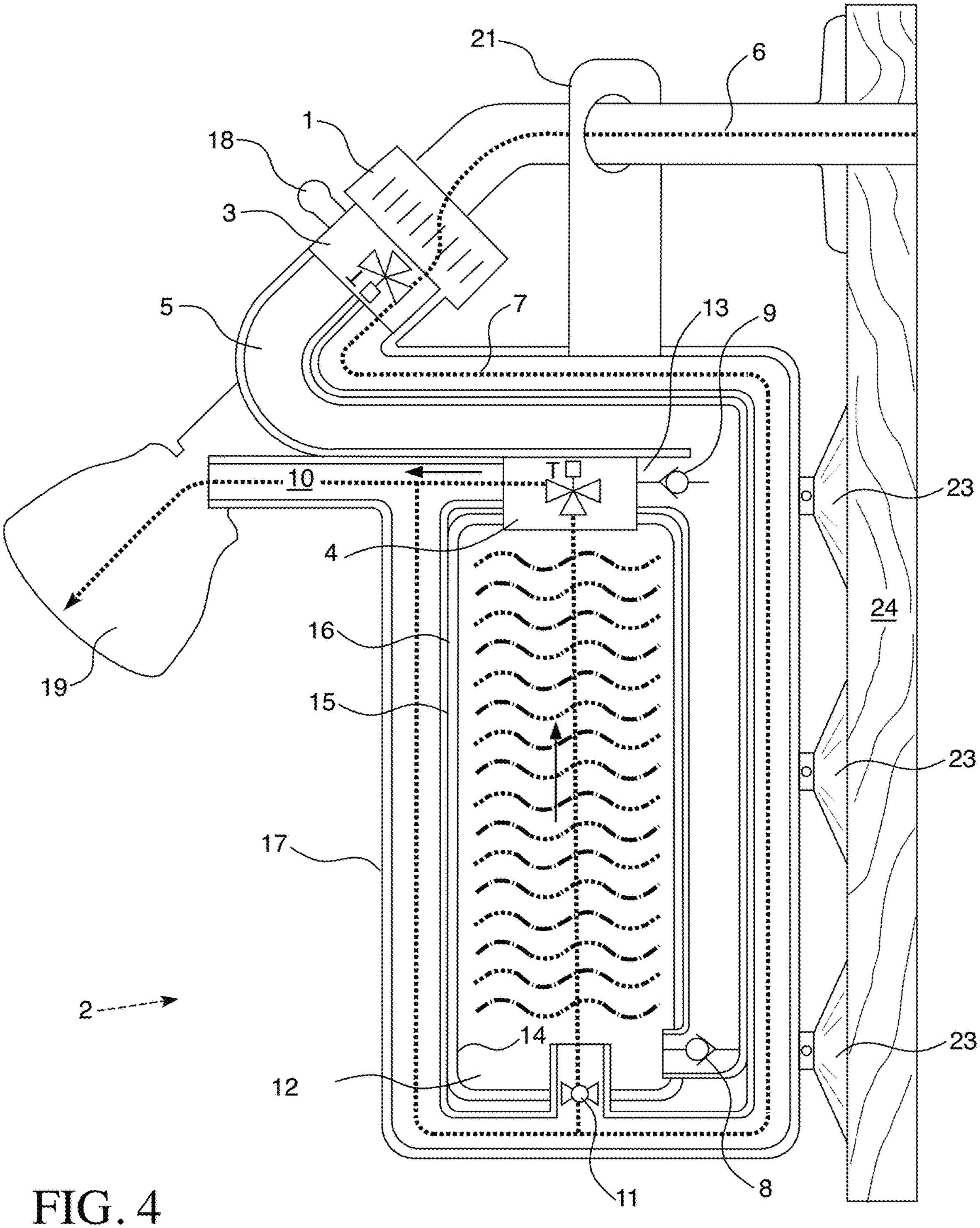
FIG. 4 shows a bisectional view of the device after all the water in device is at or near the optimal temperature after enough recirculation and mixing.

At some point during the engagement of the device as depicted in FIG. 3, water at or near the optimal temperature from the hot water source will enter device 2 from shower arm 6. Initial thermostatic diverter valve 3 sensing the water at or near the optimal temperature channels the hot water to the hot water channel 7. Hot water channel 7 then transports the hot water to the bottom end 12 of insulated chamber 15 where hot water is split between two pathways via flow control valve 11. A predetermined percentage of water simultaneously routes into the insulated chamber 15 or continues through the hot water channel 7 to the showerhead 19 via outflow pipe 10. The hot water that is routed into the bottom end 12 of the insulated chamber 15 pushes the cold water up and through the recirculating thermostatic diverter valve 4. If the recirculating thermostatic diverter valve 4 senses water below the optimal temperature range it diverts the water into recirculation channel 13, then the cold water is routed via recirculating check valve 9 rejoining and mixing with the cold water in water channel 5. And then the process as described for and depicted in FIG. 2 is repeated. The cold (below optimal temperature range) water is routed through check valve 8 into insulated chamber 15 mixing with the hot water coming in from flow valve 11. This process repeats until all of the water within device 2 reaches the optimal temperature range as depicted in FIG. 4, at which time all of the water will then be diverted to the showerhead 19 and not recirculated.

All parts and components of device 2 will be inside unit encasement 17, which would comprise a waterproof material that is lightweight, but strong enough to support the device when filled with water. Some examples include, but are not limited to, various types of plastic. Preferably, the device is capable of holding approximately four gallons of water. Preferably thermostatic diverter valves will be made of made of lightweight material. The device may be further comprised of strategically placed drainage ports (not shown).

The thermostatic diverter valves 3 and 4 direct water in one direction or the other based on a temperature setting (i.e. cold water is directed through one outlet until it achieves the required temperature, at which time it is directed through another outlet). Generally speaking, thermostatic valves work when changes in water temperature cause an internal piston or bolt to move in one direction or the other, thus directing water based on a specific temperature. For most typical bathing and shower applications the optimal temperature range will substantially be between about 105 to 110 degrees Fahrenheit. Though for other applications, the optimal temperature range may vary, or have an altogether depending on the specific use.

Insulated chamber 15 may be comprised of a polymer-based material such as plastic, or aluminum. Whatever material is used, it should have some degree of insulating qualities. The chamber should be encased in an added insulating layer 14 comprised of either foam, fiberglass, or cellulose, that is safe for human exposure. The target time to keep the water at the last point of use temperature should be at approximately twenty-four hours, though potentially longer depending on the specific user and how long they go in between baths/showers, or the time in between any other specific application where warm to hot optimal temperature is needed or desired.

For the sake of brevity, conventional techniques known to a PHOSITA related to making and using aspects of the invention may or may not be described in detail herein. Accordingly, in the interest of brevity, many conventional implementation details are only mentioned briefly herein or are omitted entirely without providing the well-known system and/or process details.

The foregoing description merely illustrates the invention is not intended to be limiting. It will be apparent to those skilled in the art that various modifications can be made without departing from the inventive concept. Accordingly, it is not intended that the invention be limited except by the appended claims.

The invention claimed is:

1. A device for storing and maintaining water at or near an optimal temperature, said device comprising: an initial thermostatic diverter valve, a cold water channel, a hot water channel, an inlet check valve, a flow control valve, a recirculation channel, an insulated chamber, a recirculating thermostatic diverter valve, a recirculating check valve and an outflow pipe;

the initial thermostatic diverter valve being capable of sensing water temperature and being capable of diverting water through either the cold water channel if the water is below the optimal temperature or the hot water channel if at or near the optimal temperature; the hot water channel being comprised of the outflow pipe, the outflow pipe being capable of connecting to a water output gadget; the cold water channel being comprised of the recirculation channel encompassing the recirculating check valve; the cold water channel being further comprised of the inlet check valve connecting the cold water channel to the insulated chamber;

the insulated chamber having a bottom end and having a top end; and the insulated chamber having an interior which is covered with an insulation layer; the insulated chamber being capable of storing water at or near the optimal temperature, the top end comprising the recirculating thermostatic diverter valve, the recirculating thermostatic diverter valve being capable of sensing water temperature and being capable of diverting water through either the outflow pipe if at or near the optimal temperature or the recirculation channel if below the optimal temperature; the bottom end comprising the flow control valve, the flow control valve connecting the insulated chamber to the hot water channel and the flow control valve being capable of splitting water via predetermined percentages to route either through the insulated chamber or to continue through the hot water channel into the outflow pipe into the water output gadget;

and the device being encased in a unit encasement unit and the device being capable of connecting to a water inlet channel.

2. The device of claim 1, the thermostatic diverter further comprising a bypass switch.

3. The device of claim 1, whereby the water output gadget is a showerhead.

4. The device of claim 1 further comprising a coupler.

5. The device of claim 1 further comprising suction cups.

6. The device of claim 1 further comprising drainage ports.

7. A method for having water at or near an optimal temperature from a previous use in bathing and showering applications comprising:

having a water system, the water system comprising a means to store water from a previous use at or near the optimal temperature and a means of connecting to a water source, said water source produces water at or near the optimal temperature, said means of connecting to a water source capable of storing water from the previous use that cools below optimal temperature over the course of time when water source is not activated;

activating water source to produce and release water at or near the optimal temperature, pushing water below optimal temperature into means to store water at or near optimal temperature causing the stored water to be pushed up into a means of connecting to a water output gadget and then out the water output gadget, sensing a boundary between water at or near the optimal temperature and water below the optimal temperature, closing a valve from the means to store water at optimal temperature to the means connecting to a water output gadget and directing water below the optimal temperature to a recirculation pathway; said recirculation pathway reconnecting with the means to store water at or near the optimal temperature near where water at or near the optimal temperature released from the water source enters the means to store water;

having water at or near the optimal temperature from the water source splitting at set percentages entering either the means to store water or continuing directly to means to connect to water output gadget and then out the water output gadget;

recirculating and mixing water below the optimal temperature with water at or near the optimal temperature until mixture is at or near the optimal temperature, sensing mixture is at or near the optimal temperature, opening the valve from the means to store water at optimal temperature to the means connecting to a water output gadget and then out the water output gadget.

8. The method of claim 7 further comprising sensing a temperature of water flowing from the means of connecting to a water source and directing water to either a first channel or a second channel, the first channel receiving water below the optimal temperature and the first channel being part of the recirculation pathway and the second channel receiving water at or near the optimal temperature and being capable of splitting water at or near the optimal temperature from the water source at set percentages, said split water entering either the means to store water or continuing directly to means to connect to water output gadget and then out the water output gadget.

* * * * *